US005606654A

United States Patent [19]

Schuur

[11] Patent Number: 5,606,654

[45] Date of Patent: Feb. 25, 1997

[54] COMPUTER SCREEN AND MEMORY ORGANIZATION ENABLING PRESENTATION OF A TREE

[75] Inventor: Adrianus Schuur, Herrenberg, Germany

[73] Assignee: International Business Machines Corporation, Armonk, N.Y.

[21] Appl. No.: 173,286

[22] Filed: Dec. 21, 1993

[30] Foreign Application Priority Data

Dec. 22, 1992 [EP] European Pat. Off. .............. 92121758

[51] Int. Cl.$^{6}$ .................................................... G06T 11/00

[52] U.S. Cl. .......................... 395/140; 395/326; 395/356

[58] Field of Search .................................... 395/140, 133, 395/134, 138, 139, 120, 123, 155, 160, 161; 364/550

[56] References Cited

U.S. PATENT DOCUMENTS

| | | | |
|---|---|---|---|
| 4,613,946 | 9/1986 | Forman | 395/160 |
| 4,658,372 | 4/1987 | Witkin | 364/550 |
| 4,710,763 | 12/1987 | Franke et al. | 395/141 |
| 5,262,761 | 11/1993 | Scandura et al. | 395/160 X |
| 5,280,547 | 1/1994 | Mahoney | 382/49 |

*Primary Examiner*—Almis R. Jankus

[57] ABSTRACT

A method for displaying a n-ary tree graph (30) on a display screen (100) is disclosed. The method comprises a first step of dividing the display screen (100) into one or more equally sized portions, a second step of displaying in said display screen portions at most one node (10) of said n-ary tree graph (30) and a third step of displaying in the same display portion as the node (10), the child nodes (20) of said node (10) of said n-ary tree graph (30). On the display screen (100), symbols (120, 140) corresponding to said node (10) or said child nodes (20) are displayed in the top left hand corners of the display screen portions. These symbols may incorporate visual clues ('no more room') to indicate that said child nodes (20) themselves have child nodes (i.e. grandchild nodes) which cannot be displayed and visual clues ('no more room') to indicate that said child nodes (20) have siblings which cannot be displayed.

22 Claims, 11 Drawing Sheets

FIG. 3A
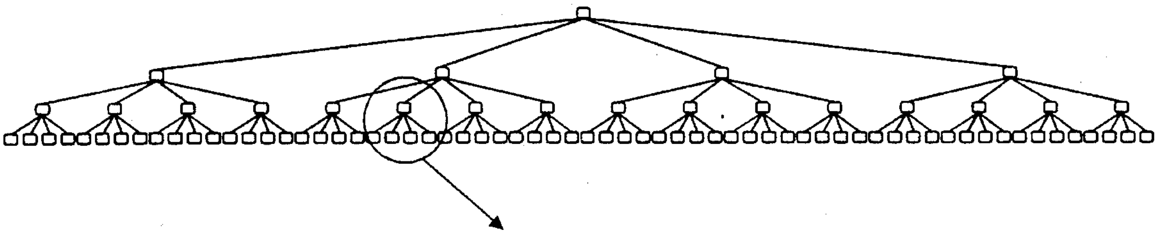
FIG. 3B
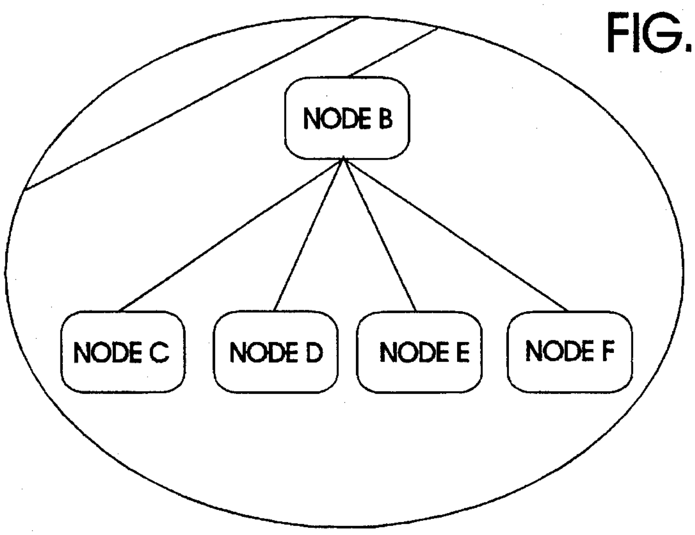
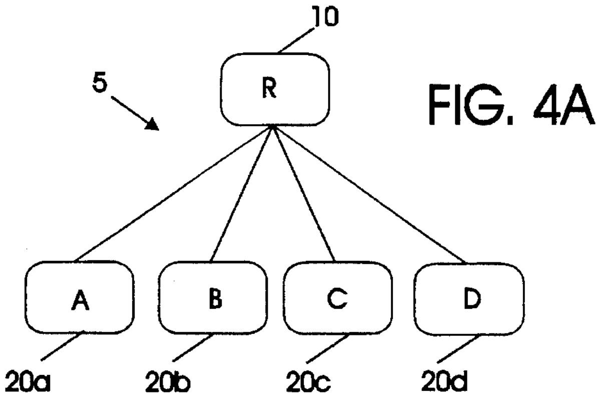
FIG. 4A

COMPUTER SCREEN AND MEMORY ORGANIZATION ENABLING PRESENTATION OF A TREE

FIELD OF THE INVENTION

The invention relates to a computer with display screen and display memory upon which n-ary tree graphs are displayed.

DEFINITIONS

A tree is a non-linear data structure consisting of a finite set of nodes in which one node is called the root node and the remaining nodes are partitioned into disjoint sets, called subtrees, each of which is itself a tree.

The order of a tree is the maximum of subtrees of any node.

n-ary trees are trees of order n.

BACKGROUND TO THE INVENTION

N-ary trees quickly become very wide structures that are difficult to display on computer terminals. When fully populated, the number of nodes at the lowest level in the tree equals $n^h$ where n is the number of children in each node and h is the height of the tree. If n=8 and h=3 this will, for example, result in 512 nodes which is very difficult to visualise and clearly impossible to display on a conventional display screen.

In the prior art, zooming and/or scrolling techniques have been used to enable the user to view the tree at a reduced scale or in a fragmentary way. These can be illustrated by taking a more simple example than that given above in which each node has four children and the tree has a height of 3. Such a structure is very regular, which is not typical of tree data structures but it is used to depict the worst case width of such a tree. FIG. 1 shows how such a tree would be shown on a display screen.

In this depicted example, it would be impossible for the observer of the tree to read any captions or information associated with each node of the tree. FIG. 2 shows an example when zooming techniques are used to view a part of the tree structure of FIG. 1. Clearly one has gained on detail, however it is difficult to recognize what area of the tree is presented.

Sometimes the view of FIG. 2 is combined on the display screen with a small scale picture of the complete tree structure as is shown in FIG. 3. A rectangle is superimposed on the small scale picture of the complete tree structure to indicate the portion of the tree structure that is currently shown in the main part of the display screen.

The disadvantage of using scrolling and zooming techniques is that it is extremely difficult to navigate through the tree structure. Taking the display of FIG. 3 as an example and supposing that the portion of the tree structure which the observer wishes to view is not the portion that is displayed in the main part of the display screen, then it can take up to five attempts to display the desired portion of the tree structure if one starts at the left hand side of the bottom row of the tree structure and the desired portion is on the right hand side of the tree structure. This form of display and navigation clearly does not lend itself to a systematic approach of finding ones way in a hierarchical structure.

Known from the published prior art are various means of depicting tree structures. For example U.S. Pat. No. 4,710,763 (Franke et al) discloses a method for constructing and displaying tree structures with automated data processing equipment. The method taught in this patent is to provide a focused view of a portion of the tree to enable an observer to perform editing and evaluating functions on the displayed tree structure. The focused view present a view of a portion of the tree structure with a geometry different that that which would be used if the entire tree structure were displayed. This provides a view of a portion of the tree which is highly readable but does not allow the observer to perceive the position of the portion of the tree within the entire tree structure.

In the IBM Technical Disclosure Bulletin, vol 34, no 8, January 1992, pp 432–433, an article entitled "Hierarchical Menu Display Structure" teaches the display of a menu system in tree form and a method for controlling the menu system. The article does not, however, teach how the display of the menu system in tree form is optimised on the display screen.

An article in the IBM Technical Disclosure Bulletin, vol 34, no 4A, September 1991, pp 402–404, entitled "Efficient Display of Tree-form Data on VDU or Printer" teaches a method of producing tree-form diagrams which can be used both with fixed and proportionally spaced character fonts. In this article, a method for displaying trees whose nodes consist of alphanumeric characters is described. The teachings are, however, not applicable to tree structures in which the nodes may also be presented in the form of bitmaps or icons.

SUMMARY OF THE INVENTION

The object of the invention is therefore to provide an improved method and apparatus for displaying tree graphs on a display screen.

This object is solved by providing a method for displaying a n-ary tree graph on a display screen which comprises a first step of dividing the display screen into one or more equally sized portions and a second step of displaying in said display screen portions at most one node of said n-ary tree graph.

The inventive method further comprises a third step of displaying in the same display screen portion as the node, the child nodes of said node of said n-ary tree graph. This third step is achieved by dividing said same display screen portion into k further equally sized display screen portions, where k is the number of child nodes of said node, and displaying in said divided display screen portions at most one child node of said node. The said equally sized display screen portions are rectangular in shape.

In the inventive method, symbols corresponding to said node or said child nodes are displayed in the top left hand corners of said display screen portions. The symbols may incorporate visual clues ('no more room') to indicate that said child nodes themselves have child nodes which cannot be displayed or have siblings which cannot be displayed.

In the method an observer may use a pointing device to select one of said child nodes in order to display on said display screen the child nodes of said child nodes, upon which said n-ary tree graph will be reordered on said display screen. The node to which the selected one of the child nodes is connected is displayed in an unused channel on said display screen. The selected one of said child nodes is displayed in the top left hand corner of said display screen.

The inventive method may also be used for displaying a directed acyclic graph whereby a selected one of said nodes is displayed not at the edges of said display screen, the nodes of which said node is a child node are displayed in equally sized display screen portions in a first part of the display screen, and the child nodes of said node are displayed in equally sized display screen portions in a second part of the display screen. In a preferred embodiment, the first part of the display screen is the part of the display screen above said selected one of said nodes and said second part of the display screen is the part of the display screen below said selected one of said nodes.

The method may be used for reducing the amount of space on a display screen required to display a n-ary tree graph. In particular the method may be used to display a configuration diagram for a computer system.

The inventive apparatus comprises a workstation with display screen, upon which n-ary tree graphs are displayed, with processing unit incorporating a visual display unit controller wherein each node of the n-ary tree graph is displayed in one of a plurality of equally sized portions of said display screen. On the display screen of the workstation, child nodes of said each nodes are displayed in the same one of said display screen portions. The display screen portion of the workstation is divided into k further display screen portions, where k is the number of the child nodes of the node, and each child node is displayed in one of said k divided display screen portions. A pointing device is incorporated in said workstation to allow an observer to select any one of said nodes or child nodes.

DESCRIPTION OF THE DRAWINGS

FIG. 3 shows an example of the enlarged portion of the tree on a display screen with a small scale version of the tree.

DETAILED DESCRIPTION OF THE INVENTION

Figure 1:
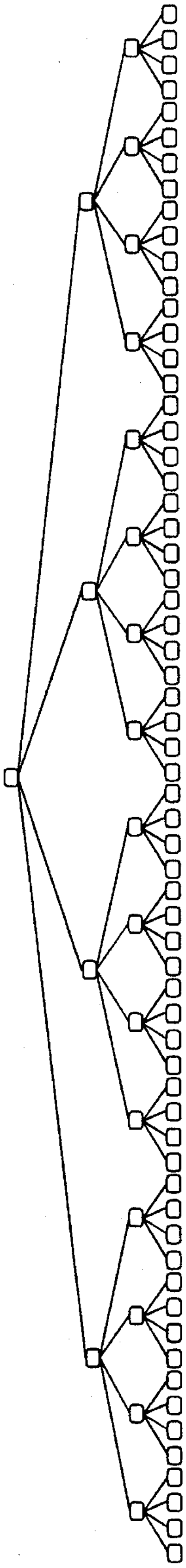
FIG. 1 shows an example of a tree on a display screen.
Figure 2:
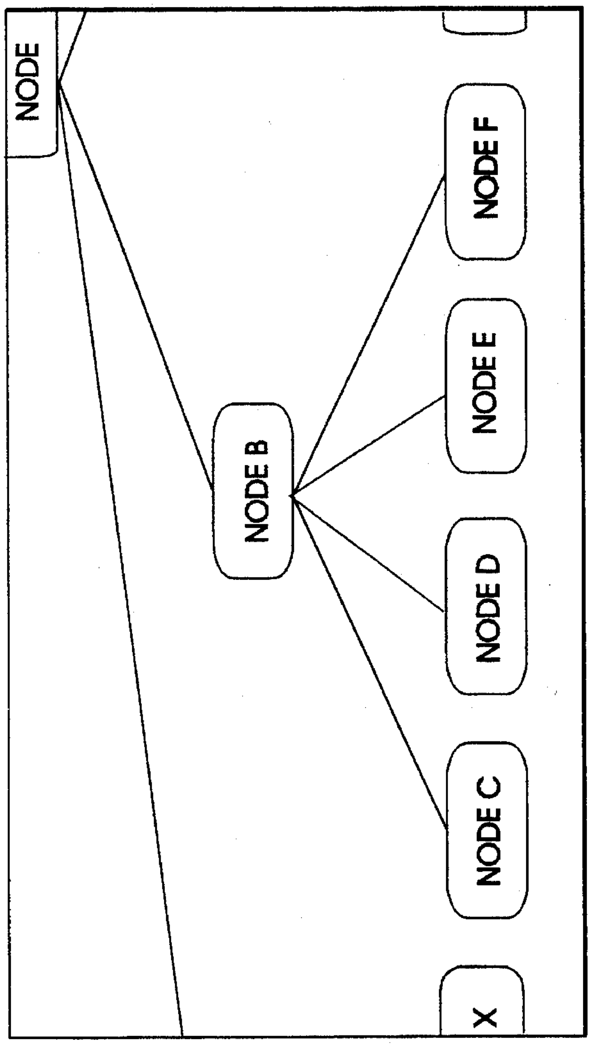
FIG. 2 shows an example of an enlarged portion of the tree on a display screen.

If one considers the traditional layout of a tree as shown in FIG. 1, the very inefficient way in which trees use the display screen real estate will be appreciated. On a display screen with an aspect ratio of 3/4, the tree in FIG. 1 uses less then 33% of the screen real estate. It would of course be possible to stretch the tree vertically but that would not really improve the situation. The fact is that the aspect ratio of an n-ary tree becomes disproportionally smaller with increasing tree height.

The natural way for the observer of viewing a tree is by descending step by step from the top of the tree, i.e. the root node, to nodes in the lower levels. It is therefore important that the next node level should have sufficient detail for the observer to be able to choose in which way to descend further. The further away from the current node level, the smaller amount of detail the observer needs. This requires that while descending, the layout of tree on the display screen has to be adjusted dynamically so that the next node level is always shown with maximum detail.

Figure 4B:
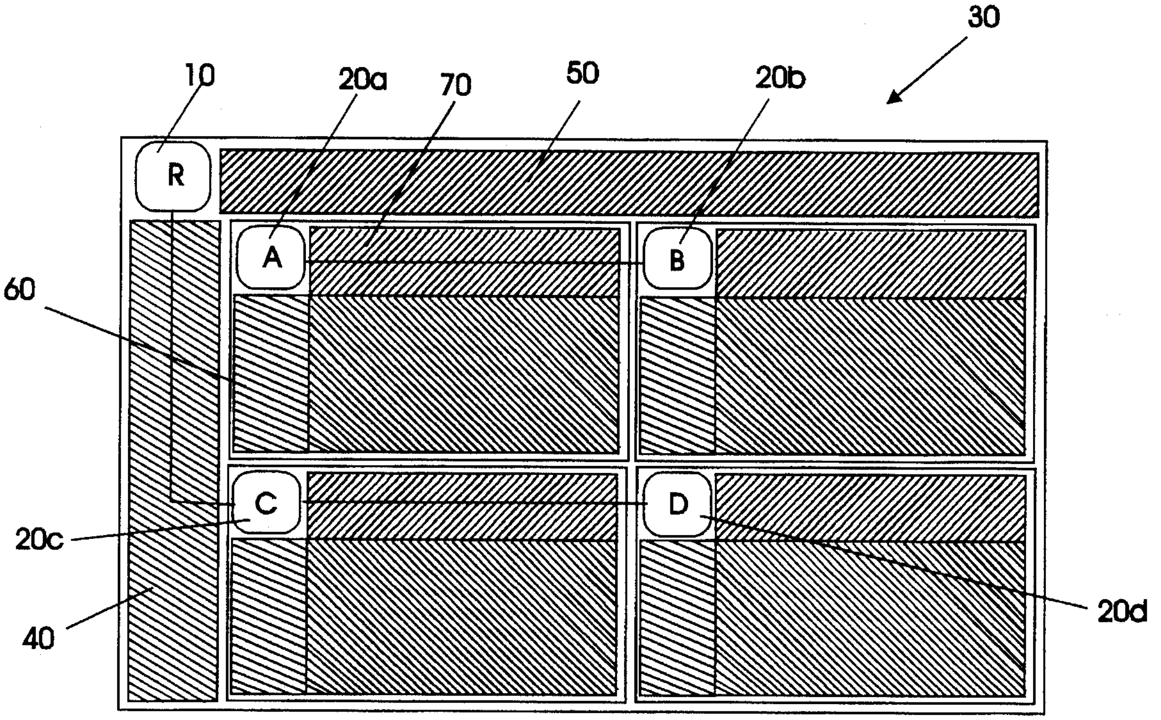
FIGS. 4(A–B) show a conventionally displayed tree structure and a tree structure generated by the method of this invention.

One way in which this can be achieved is shown in FIG. 4*a* and FIG. 4*b*. FIG. 4*a* shows a typical tree structure 5 with a parent node 10, four child nodes 20*a–d* and a height of 2. FIG. 4*b* shows the same tree in which the "triangular" form of the tree structure 5 has been converted to a nested rectangular form 30. FIG. 4*b* also shows four shaded areas: the parent vertical channel 40, the parent horizontal channel 50, the child vertical channel 60 and the child horizontal channel 70. The function of these areas will be explained later.

Figure 5A:
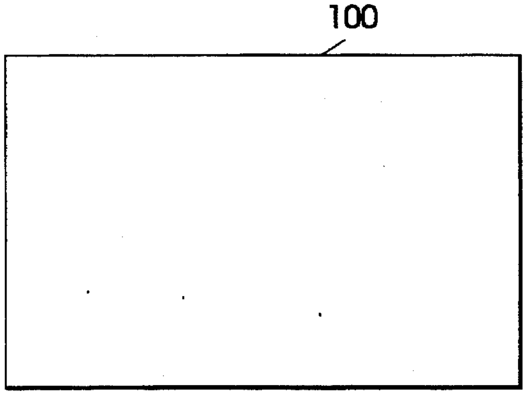
FIGS. 5(A–F) show the steps involved in generating a tree structure according to the method of this invention.
Figure 5B:
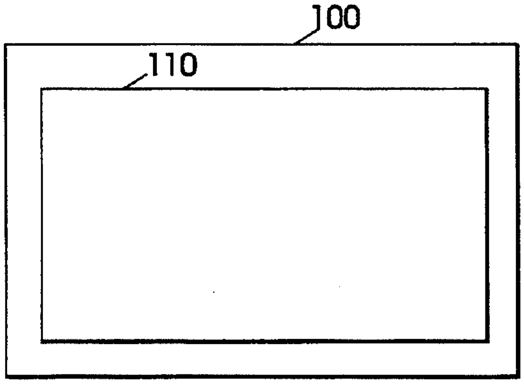

The transformation of the triangular tree structure 5 of FIG. 4*a* to the rectangular tree structure 30 of FIG. 4*b* can be described with the help of FIGS. 5*a–5f*. FIG. 5*a* shows a blank display screen 100. In FIG. 5*b*, a large part of the blank display screen 100 is nominally allotted to the parent area 110. In practice, it is unlikely that the parent area 110 will be explicitly displayed on the display screen 100 (i.e. in the form of a separate colour or by framing it), rather the area is allocated to display within it all the child nodes of the parent node as explained below. There may be, of course, situations in which it may be desirable to highlight the parent area 110 and this can also be done in the context of the current invention.

Figure 5C:
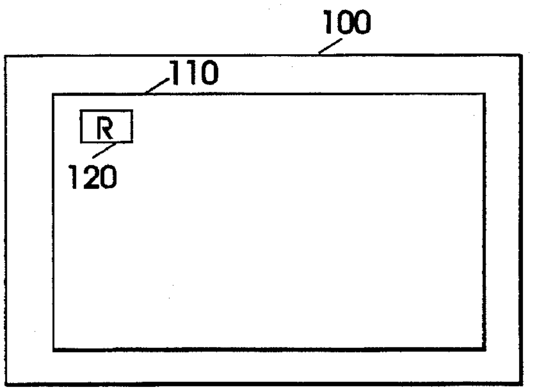

FIG. 5*c* shows the next step of the transformation in which the symbol representing the parent node 10 is placed in the top left hand corner of the parent area 110. This is shown on the diagram by a framed symbol R 120. The framed symbol R 120 is only one example of a symbol that may be chosen to represent the parent node 10, the actual parent symbol 120 chosen may be larger or smaller in size, depending on the rectangular tree 30 to be displayed.

Figure 5D:
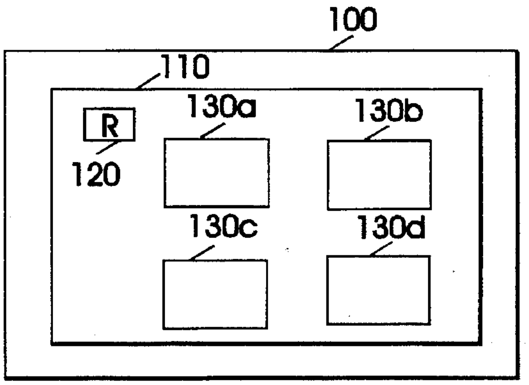

Part of the remaining parent area 110 is then divided into child areas 130*a–d* as shown in FIG. 5*d*. In the example given, the parent node 10 has four child nodes 20*a–d* and thus the division of the remaining area is simplified. Again these child areas 130*a–d* are not necessarily highlighted on the display screen 100 but rather represent logical divisions of the display screen 100.

Figure 5E:
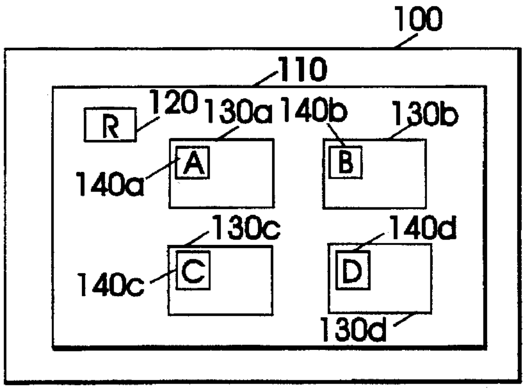

In FIG. 5*e*, symbols 140*a–d* representing the child nodes 20*a–d* are placed in the top left hand corner of each of the child areas 130*a–d* in a similar manner to the placement of the symbol 120 representing the parent node 10 in the top left hand corner of the parent area 110.

Figure 5F:
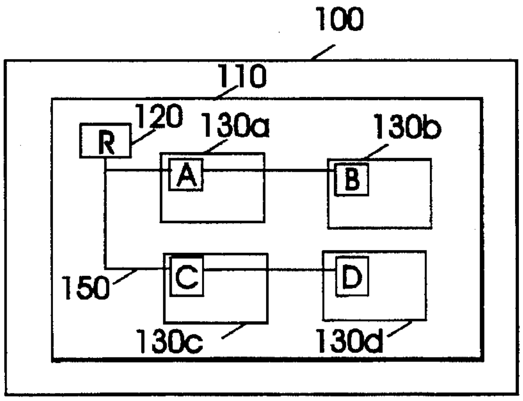

Finally, as shown in FIG. 5*f*, the hierarchy lines 150 indicating the connections between the parent node 10 and the child nodes 20*a–d* are created. These lines are normally displayed on the display screen 100.

This transformation process can be continued recursively for grandchild nodes (i.e. child nodes of the child nodes 20*a–b*) if they exist. The child area 130*a–d* are then divided into grandchild areas (not shown) into which symbols (not shown) representing the grandchild nodes are similarly placed in the top left hand corner of each of the grandchild areas.

In the simple example shown above, the parent node 10 had only four child nodes 20*a–d*. The transformation can, however, be generalised for the situation in which the parent node 10 has k children. In this case the parent area 110 will be divided into an array of m columns and n rows, where m is the square root of k, rounded up to the nearest integer, and n is k divided by m, rounded up to the next integer. Alternately n may be the square root of k, rounded up to the next integer, and m may be k divided by n, rounded up to the next integer.

The child areas 130 are then created at the intersections of the rows and columns. It is possible in this case that more child areas 130 may be created than child nodes 20 of the parent node 10. In this case some child areas 130 are left blank, i.e. no child symbol 140 is placed in the left hand top corner. The child areas that are left blank are generally those on the far right hand side of the display screen 100, and in particular those in the bottom of the display screen 100. Other child areas 130 could, however, be left blank.

The parent vertical channel 40, the parent horizontal channel 50, the child vertical channel 60 and the child horizontal channel 70 as shown in FIG. 4*b* are normally unused areas of the display screen 100. They may not be occupied by the child areas 130 or, if they are present, the grandchild areas. They may, however, be occupied by the hierarchy lines 150 if required and, as outlined below, symbols representing other nodes of the n-ary tree. The size of the parent channels 40 and 50 depends on the size of the parent symbol 120. The width of the parent vertical channel 40 is slightly wider than the width of the parent symbol 120. The height of the parent horizontal channel 50 is slightly higher than the height of the parent symbol 120. Similarly the widths of the child vertical channels 60 are slightly wider than than the widths of the child symbols 140 and the heights of the child horizontal channels 70 are slightly higher than the heights of the child symbols 140.

If FIG. 4*b* is reconsidered, it is apparent that room for display of the child nodes 20 gets progressively less while descending the tree. Two techniques are used to help the user cope with this. Firstly, visual clues can signal to the observer that there are more nodes than can be currently shown on the display screen 100. This will be described below. Secondly, symbols of decreasing size, can be used which take up less space and allow the unused areas on the display screen 100 occupied by the channels 40, 50, 60 and 70 to be reduced.

Figure 6A:
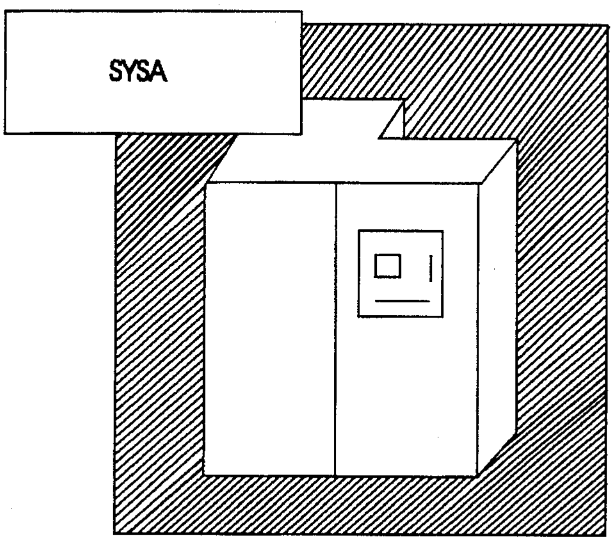
FIGS. 6(A–C) show the various levels of detail of a displayed node.
Figure 6B:
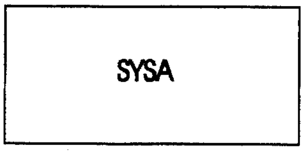
Figure 6C:
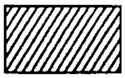

An example of such symbols is shown in FIGS. 6*a*–6*c*. FIG. 6*a* illustrates a symbol showing all details of the node to be displayed and consists of a icon or bitmap offering a pictorial representation of the real thing and a name tag. FIG. 6*b* shows a symbol showing less detail and consists only of the name tag. Finally the smallest symbol is illustrated by a small rectangle which shows no detail at all but simply signals that a node is there. The size of this smallest symbol varies and depends on the area allotted to the node, but in the preferred embodiment will not be larger than a name tag and not smaller than 3×3 pixels. If it is smaller, a 'no more room' condition is raised, which is discussed later. The three detail levels are numbered 1 to 3, whereby 1 indicates the highest detail level (i.e. picture and name tag) and 3 the least detailed level (i.e. small rectangle). The layout generating method automatically selects the level of detail depending on the area assigned to a node and the size of the three possible levels of detail.

Figure 7:
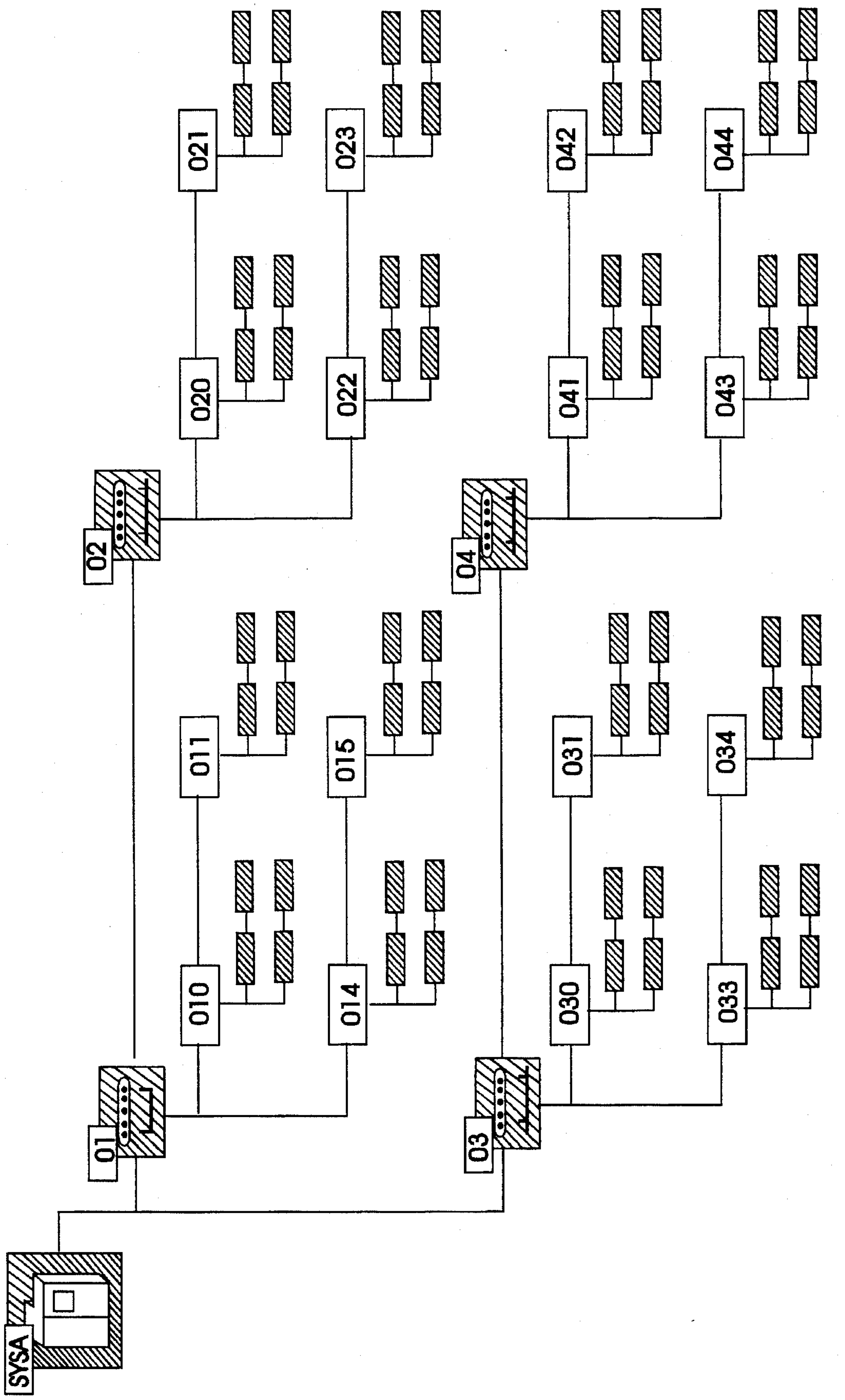
FIG. 7 shows the use of the method of the current invention in generating a configuration diagram for a computer system.

FIG. 7 shows an example of the layout generating method. The objects or nodes of the tree shown here are parts of an IBM computer configuration. The root node (i.e. the parent node 10) is a Central Processing Unit (CPU) named 'SYSA'. The CPU has four Channels to communicate with external devices named '01', '02', '03' and '04'. These are the child nodes 20. The devices normally need Control Units to operate properly, they are labeled '010' through '044'. These are the grandchild nodes. Finally the devices—which are great-grandchild nodes—themselves are shown as unspecified rectangles. This configuration is merely an example used to show the effects of the layout generating method. The height of the tree (three) and the number of nodes per level (four) is exactly the same shown in FIG. 1. However, by using the described layout generating method, much more detail is provided and systematic navigation through the displayed tree is easier as will now be explained.

Figure 8:
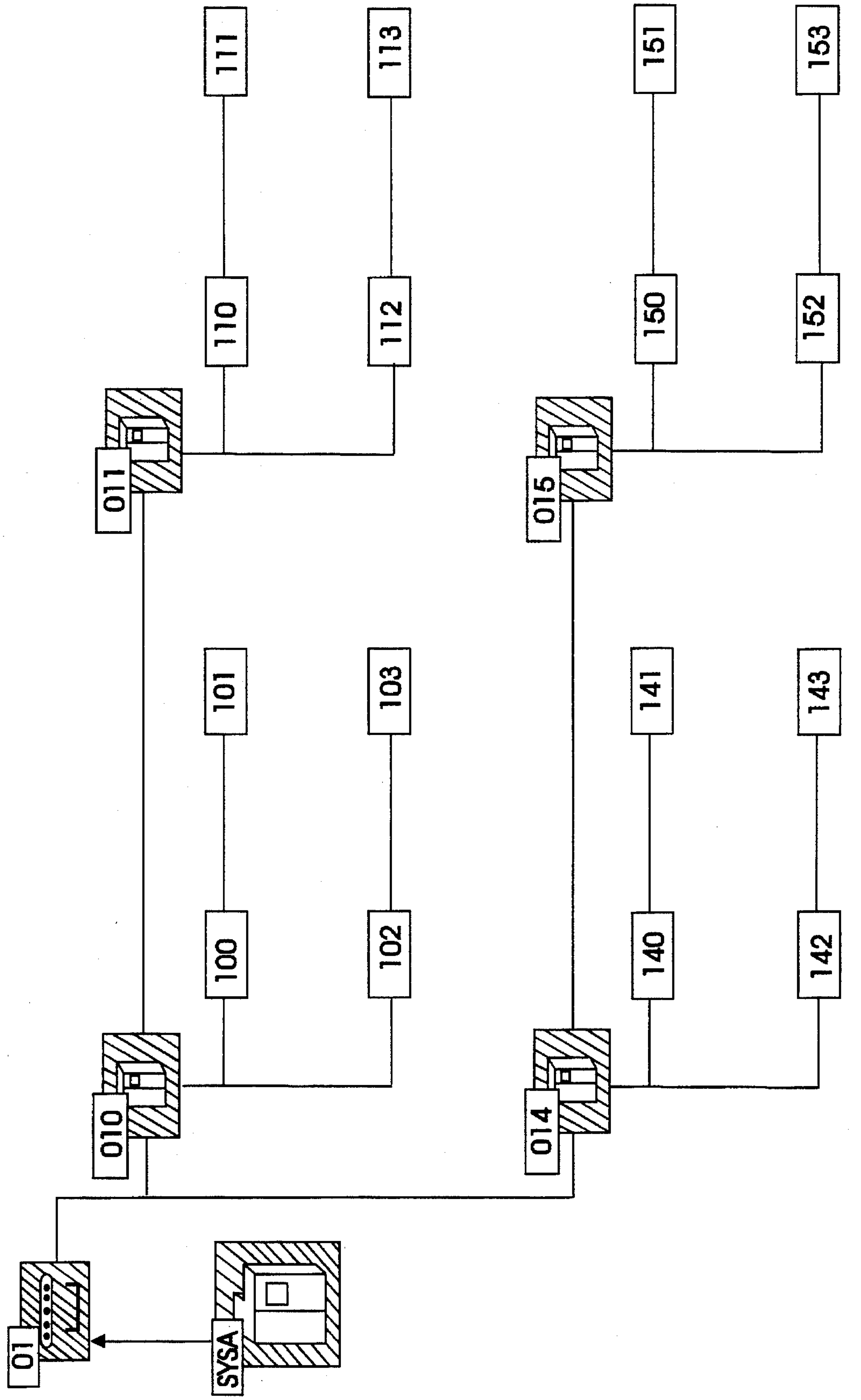
FIG. 8 shows the same configuration diagram after the observer has navigated to a lower node level.

Suppose that the observer now wishes to inspect a node in more detail. A pointing device, such as a mouse, can be used to indicate the node of interest. For example, the observer wishes to look at the child nodes of the channel '01' (i.e. the grandchild nodes of the top node 'SYSA'). The observer points at channel '01' and causing the appropriate interrupt (e.g. double click of the first mouse key) signals a select request to the navigation support provided by the layout generation method. The navigation support will respond by generating a new picture on the display screen 100 as shown in FIG. 8, Channel '01' is now the top node, i.e. the node in the top left hand corner of the display screen 100. CPU 'SYSA', the former top node, is pushed down the parent vertical channel 40 and is connected with new top node, channel '01', via an arrow to indicate that the '01' node is a child node of the 'SYSA' node, but not necessarily the only one.

If the observer decides to go further down the displayed tree by selecting Control Unit '010', the '010' node would become the top mode and the '01' node as well as the 'SYSA' node would be pushed down the parent vertical channel 40. The parent vertical channel 40 is thus used to show the trail of ancestors of the top node. In actual practice, the observer may select any node, the node selected will become the top node and the parent vertical channel 40 will be updated accordingly. Returning to any one of the ancestor nodes (i.e. parent node, grandparent node etc.) is accomplished by selecting any node in the parent vertical channel 40.

Figure 9:
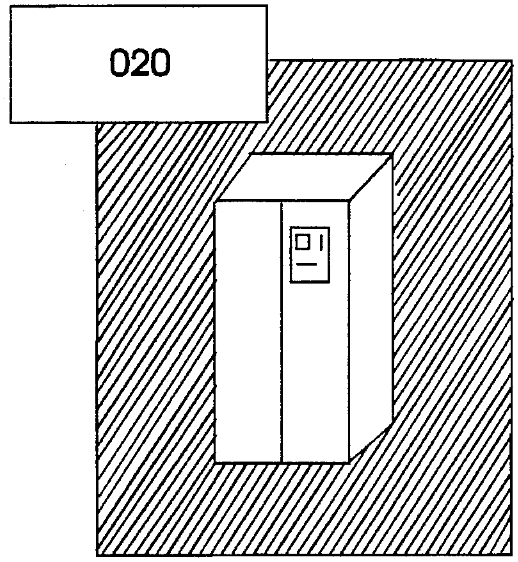
FIG. 9 shows a displayed node with a no more room visual clue.
Figure 9:
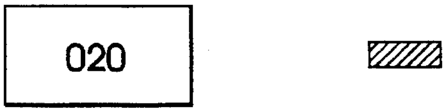

As mentioned previously, there is, at times, is not enough room to display all the possible child nodes 20. In this case a visual clue such as a dark shadow below and to the right of the node is added to the parent node as shown in FIG. 9. By selecting such a node, it will automatically become the top node and normally should have enough room to display its own child nodes.

Children of the top node preferably have at least enough room to show detail level 2 (name tag). If this is not possible, there may be a serious navigation problem since the observer cannot systematically select the next level. This situation will arise when the top node has tens or hundreds of child nodes, or when the logical screen (window) used to display the tree is small.

When this situation is detected by the layout generating method, it will switch over to the so-called index mode. In the index mode, only those name tags for which there is room will be displayed, evenly distributed among the child nodes of the top node. For example, a name tag (detail level 2) will be displayed for every n'th child. To indicate that the parent node 10 has many more child nodes 20, a further visual clue, the index clue which might, for example, an ellipsis (i.e. three full stops . . . ) is appended to the name tag.

Additionally the 'no more room' clue may be added. The displayed child nodes 20 therefore represent a range of child nodes starting with the displayed child node. It must be possible to display at least two child nodes in index mode, otherwise the user will be instructed to enlarge the window in which the tree structure is presented, or terminate the application.

Figure 10A:
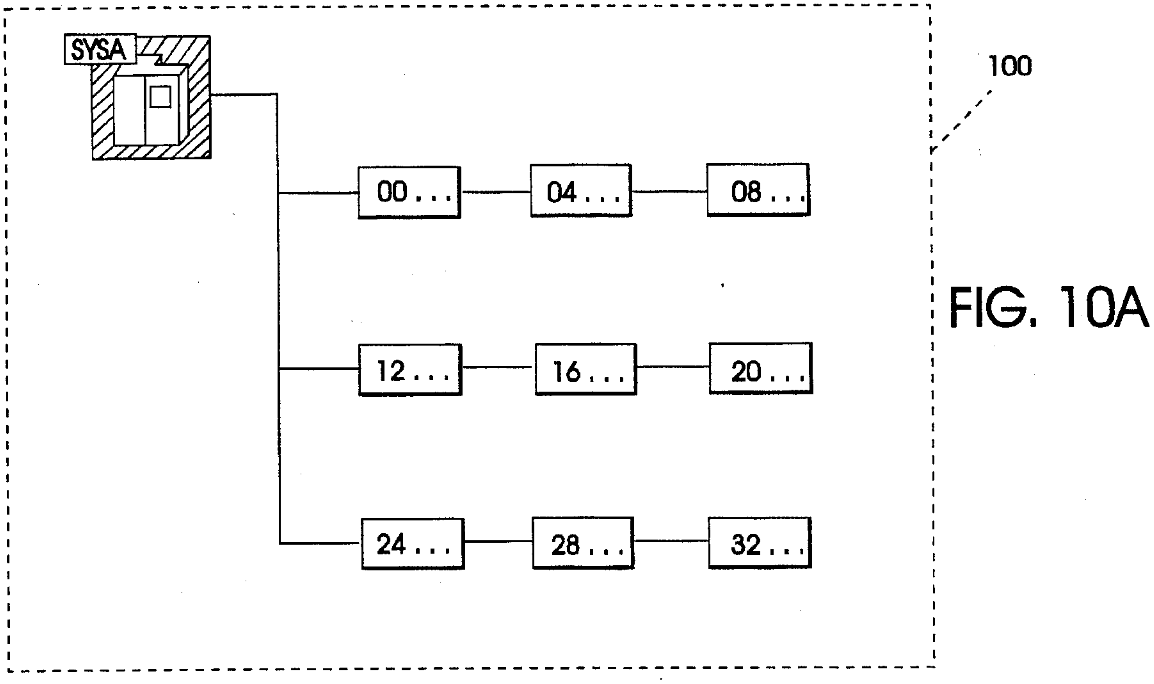
FIGS. 10(A–B) show displayed nodes with index clues.
Figure 10B:
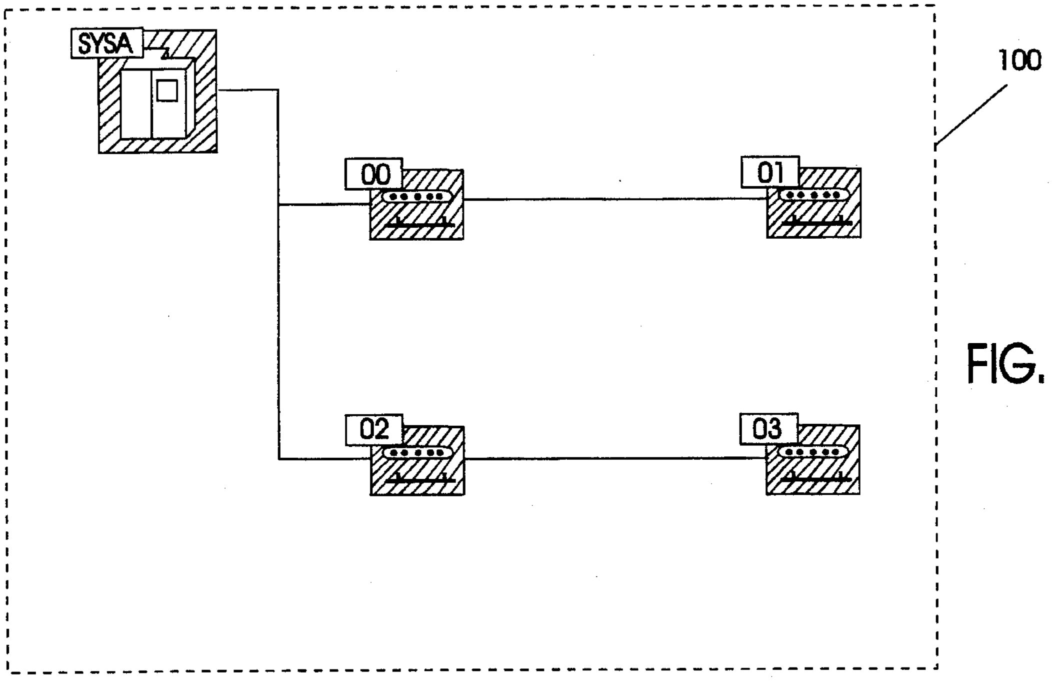

An example of a tree with more child nodes 20 than can be shown on the display screen 100 is shown in FIG. 10*a*. The top node 'SYSA', representing the Central Processing Unit, has 36 child nodes, each of which represents a Channel and are numbered '00', '01', . . . '35' to '36'. Not all of these child nodes may be displayed on the display screen 100, instead every fourth child node is displayed together with the 'index' clue attached to the name tag and the 'no more room clue' attached to the child symbol 140. Selection of one of the child nodes 20 results in a display of the range of child nodes 20 that it represents as is shown in FIG. 10*b*. The top node 'SYSA' will now have the 'index' clue appended to its name tag to indicate that it has more child nodes 20 than may be displayed on the display screen 100. It should be noted that the grandchild nodes (i.e. the control units) of the child nodes may be displayed or, as is shown in FIG. 10*b*, a 'no more room' clue added to the child symbols 140.

Strictly speaking, a child node 20 in a tree cannot have more than one parent node 10. If this is the case, the data structure is termed a Directed Acyclic Graph (DAG) and it is no longer a tree structure. The layout generating method supports a very specific form of a DAG namely, a data structure where a child node 20 can have multiple nodes as parent nodes 10 which are located one node level higher and which are not necessarily siblings. In the computer configuration layout example of FIG. 7, this means that a control unit '010–'044' can be connected to multiple channels '01', '02', '03' or '04', or a device could be connected to multiple control units '010'–'044', whereby each control unit '010'–'044' could be connected to a different channel '01', '02', '03' or '04'.

Figure 11:
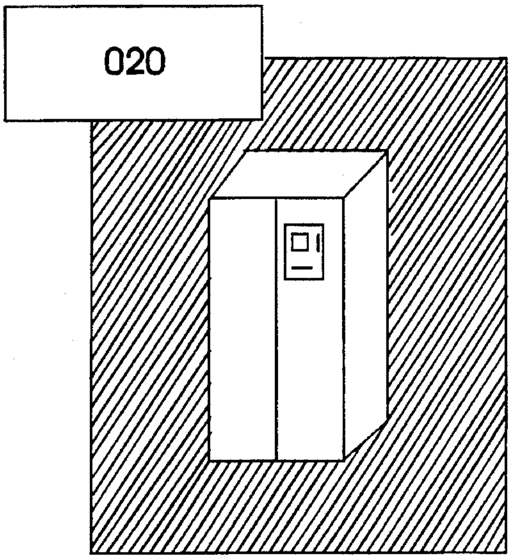
FIG. 11 shows a displayed node with multiple parents visual clues.
Figure 11:
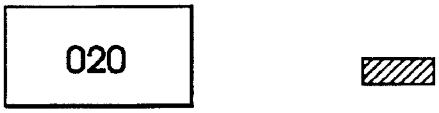

The layout generating method makes no attempt to show all the parent node 10 connections of a child node 20 directly. If all control units '010'–'040' in FIG. 7 were connected to all channels '01', '02', '03' or '04' (which is technically possible and not uncommon), and all those connections were shown, the display screen 100 would become virtually unreadable. The layout generating method will detect such a situation and will show only one parent node—child node connection. As a visual clue, the 'multiple parent' clue, for example dark shadow above and to the left, is added to to the node as shown in FIG. 11.

In order see all connections of a node, the user can request the centric view of a node. The centric view of a node lets the user examine all connections of a particular node, upwards (multiple parent nodes 10) as well as downwards (child nodes 20). The node will be placed in the center of the viewing area, all ancestor nodes (e.g. parent nodes 10, grandparent nodes, etc.) will be placed above, all child nodes 20 (if any) will be placed below the node. Ancestor nodes and child nodes 20 are grouped in rows of equal hierarchy levels. If a row has not enough room to show all its members, lower levels of detail and no room clues will be used.

Figure 12A:
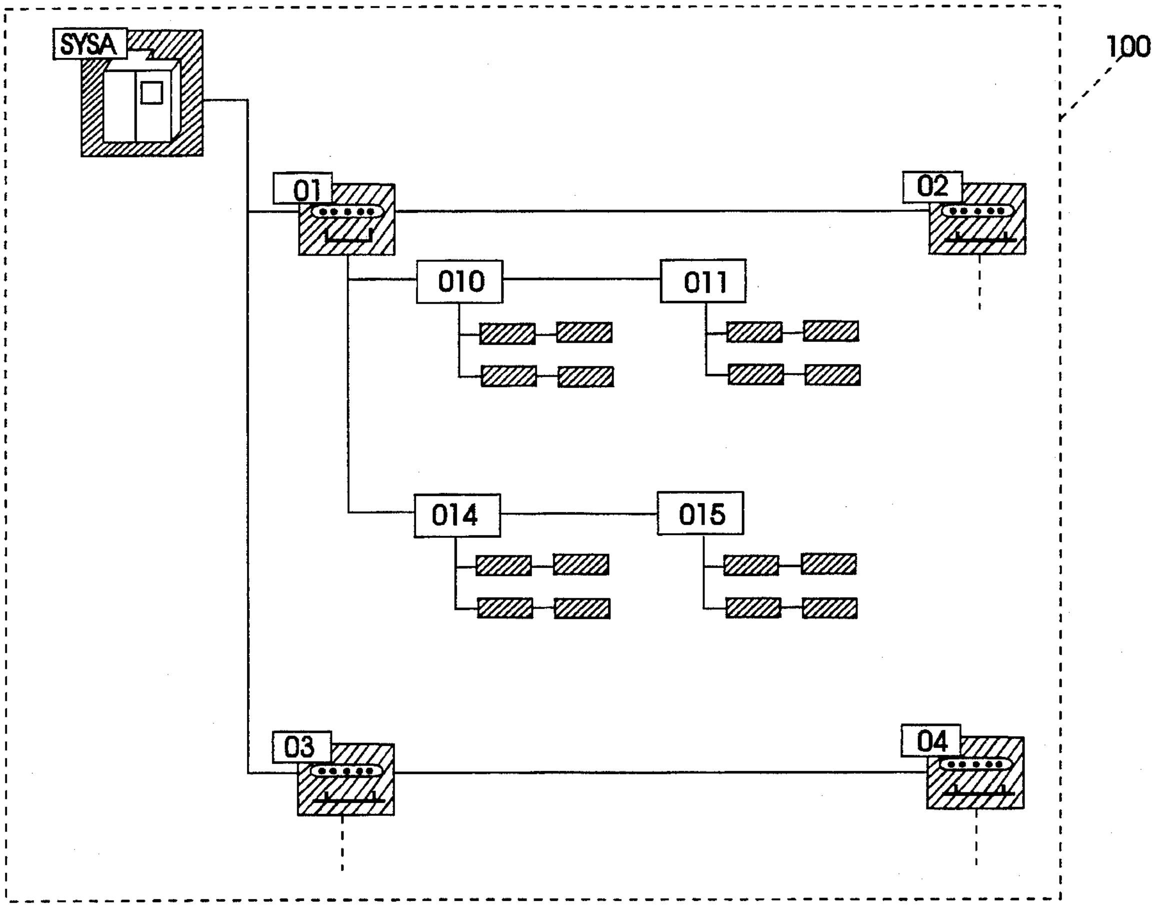
FIGS. 12(A–B) show a configuration diagram in a conventional form and in a centric view.
Figure 12B:
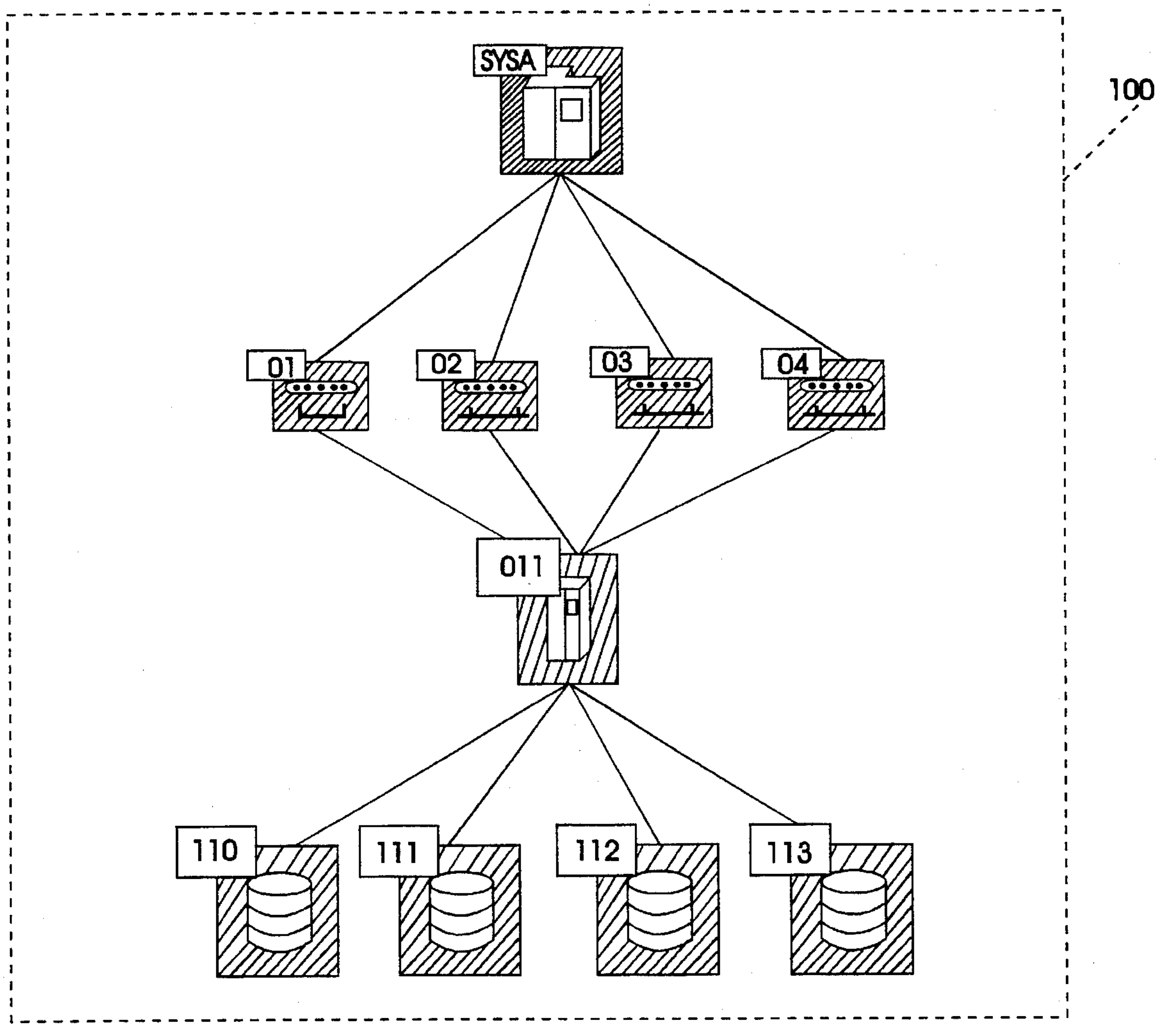

Consider now FIGS. 12*a* and 12*b*. On FIG. 12*a*, it will be seen that the control unit '011' has a multiple parent visual clue (as do the other displayed control units '010', '014' and '015'). A pointing device, e.g. a mouse, can be used to indicate the particular node. Pointing at the control unit '011' and causing the appropriate interrupt (e.g. double click of mouse key 2) signals a centric view request to the navigation support of the layout generating method. It will respond by generating on the display screen 100, the display as shown in FIG. 12*b*.

Figure 13:
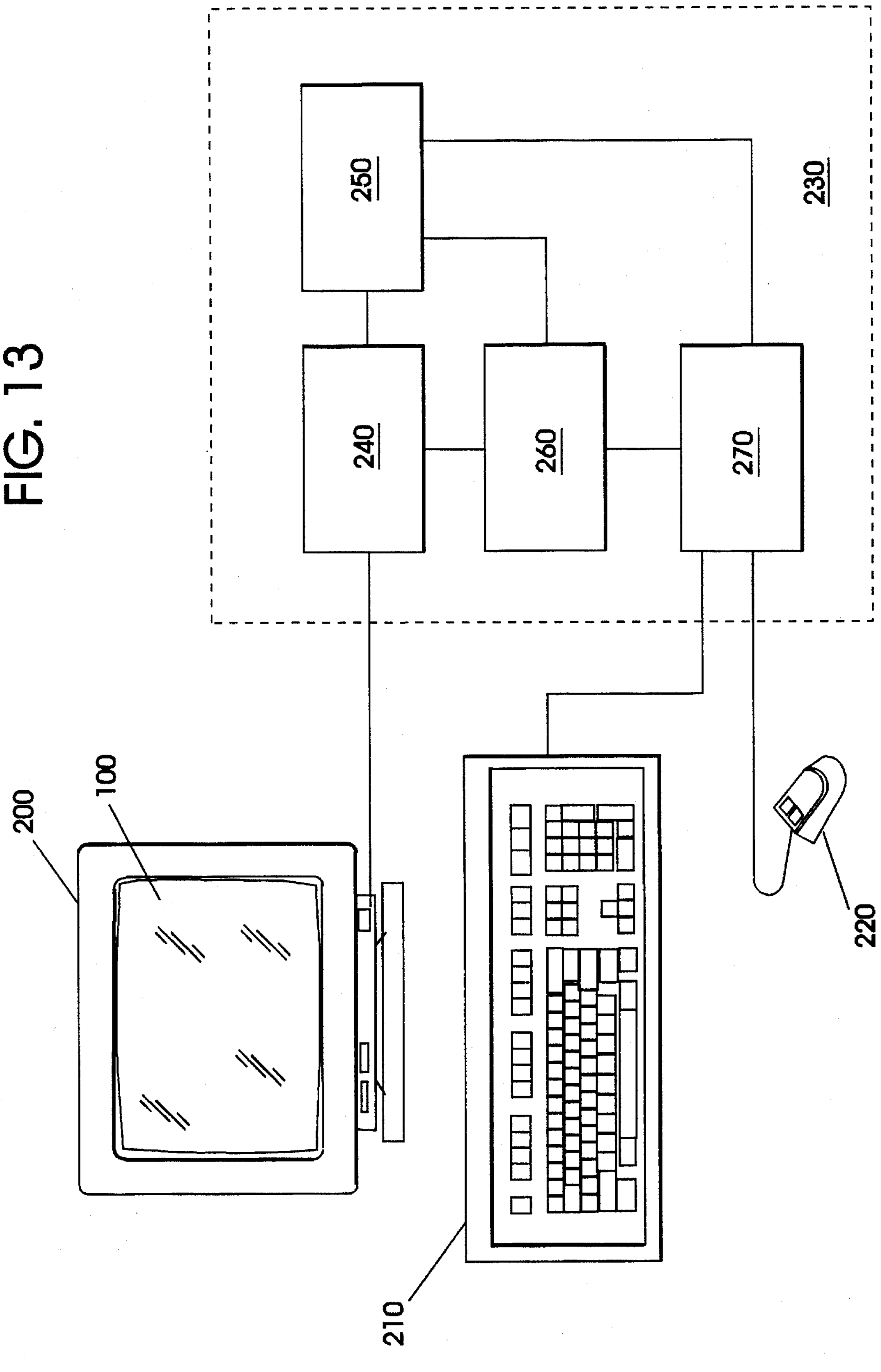
FIG. 13 shows a work station into which the layout generating method is incorporated.

FIG. 13 shows an example of a workstation in which the layout generating method is used. The workstation comprises a visual display unit 200 in which the display screen 100 is incorporated, a processing unit 230 which incorporates memory, a keyboard 210 and a mouse 220. The mouse 220 is an example of the pointing unit referred to above. In addition, the cursor keys provided on the keyboard 210 can also be used as a pointing unit and an appropriate interrupt can be generated by depressing another one of the keys on the keyboard.

Within the processing unit 230 is incorporated a visual display unit controller 240, a layout generating method controller 250, an applications program 260 and an input controller 270. The visual display unit controller 240 may be any type of unit which generates the display on the display screen 100 of the visual display unit 200, e.g. a VGA card, and incorporates visual display unit memory in which the values of the individual pixels displayed on the display screen 100 are stored. The applications program 260 is any type of applications program which generates the raw data that must be displayed in the form of tree structures. It is compiled and stored in object code in the processing unit 230 before it is run. The input controller 270 is connected to both the keyboard 210 and the mouse 220. It takes the interrupts from the keyboard 210 and the mouse 220 and passes them to the applications program 260 and also to the layout generating method controller 250. In particular, it passes those interrupts required for navigating through the tree produced on the display screen 100 to the navigation routines of the layout generating method controller 250.

The layout generating method controller 250 comprises the routines required to generate the tree structure on the display screen 100 as described above. It also includes the navigation routines which are used to navigate through the tree structure. The layout generating method controller 250 takes the raw data from the applications program 260 and generates the optimal tree structure using the layout generating method. It also takes the interrupts supplied from the mouse 220 or the keyboard 210 and processes these in order to navigate through the tree structure. The layout generating routines and the navigation routines co-operate in order to display the best tree structure on the supplied display screen 100. The layout generating method controller 250 may be supplied, for example, as a module in a dynamic link library which can be linked to the compiled applications program 260 or it may be supplied as source code which is incorporated into the source code of the applications program 260 before compilation.

I claim:

1. A method for displaying a $N_H$ by $N_V$ tree graph having vertically and horizontally related nodes defined vertically and horizontally by N levels where N is a whole number of 3 or greater on a display screen comprising the steps of:

dividing the display screen into multiple equally sized portions; and displaying in said display screen portions at most one node of said $N_H$ by $N_V$ tree graph;

displaying in the same display screen portion as the node, all of the child nodes of said node of said $N_H$ by $N_V$ tree graph, wherein symbols corresponding to said node or said child nodes thereof are displayed in said display screen portions, and wherein said symbols incorporate visual icons to indicate that said child nodes have grandchild nodes which cannot be displayed.

2. The method of claim 1, wherein the step of displaying all of the child nodes comprises:

dividing said same display screen portion into k further equally sized display screen portions, where k is the number of child nodes of said node, and displaying in said divided display screen portions at most one child node of said node.

3. A method according to claim 2 wherein said equally sized display screen portions are rectangular in shape and have an aspect ratio in accordance with an industry standard.

4. A method according to claim 2 wherein symbols corresponding to said node or said child nodes are displayed in the top left hand corners of said display screen portions.

5. A method according to claim 2 wherein an observer may use a pointing device to select one of said child nodes for display on said display screen the child nodes of said child nodes, causing said tree graph to be reordered for said display screen.

6. A method for displaying a directed acyclic graph using the method of claim 2 wherein a selected one of said nodes is displayed on said display screen;

a child node is displayed in an equally sized display screen portion in a first part of the display screen; and the child nodes of said node are displayed in equally sized display screen portions in a second part of the display screen.

7. A method according to claim 1 wherein:

said equally sized display screen portions are rectangular in shape and have a specified aspect ratio.

8. A method according to claim 1 wherein said symbols corresponding to said node or said child nodes thereof are displayed in the top left hand corners of said display screen portions.

9. The method according to claim 8 wherein said symbols incorporate visual icons to indicate that said child nodes have grandchild nodes which cannot be displayed.

10. A method according to claim 1 in which an observer uses a pointing device to select one of said child nodes for display on said display screen of the selected child nodes and grandchild nodes thereof, said display screen to present the tree graph in another screen and, thereafter, reordering.

11. A method for displaying a directed acyclic graph using the method of claim 10 wherein a selected one of said nodes is displayed on said display screen;

the grandchild nodes of said node displayed in equally sized display screen portions in a first part of the display screen; and the child nodes of said node are displayed in equally sized display screen portions in a second part of the display screen.

12. A method for displaying a directed acyclic graph using the method of claim 1 wherein a selected one of said nodes is displayed connected with internodel channels of the tree graph on said display screen;

all the child nodes are displayed in equally sized display screen portions in a first part of the display screen; and the child nodes of said node are displayed in equally sized display screen portions in a second part of the display screen.

13. Use of the method of claim 12 to display a configuration diagram for a computer system.

14. A workstation with display screen, upon which tree graphs are displayed, with processing unit incorporating a visual display unit controller characterized in that at most one node of the tree graph is displayed in each of a plurality of equally sized portions of said display screen, wherein all of the child nodes of said node are displayed in the same display screen portion as the node, and wherein symbols corresponding to said node or said child nodes thereof are displayed in said display screen portions, and wherein said symbols incorporate visual icons to indicate that said child nodes have grandchild nodes which cannot be displayed.

15. The workstation according to claim 14 further characterized in that said display screen portion is divided into k further display screen portions, where k is the number of the child nodes of the parent node, and each child node is displayed in one of said k divided display screen portions.

16. A workstation according to claim 14 further characterized in that a pointing device is incorporated in said workstation to allow an observer to select any node or child nodes thereof.

17. A workstation according to claim 14 further characterized in that a pointing device is incorporated in said workstation to allow an observer to select any one of said nodes or child nodes.

18. A method of displaying a tree graph having the dimensions of $N_H$ by $N_V$ having vertically and horizontally displayed internodal channels, the method of displaying the tree graph comprising forming a first display screen showing a higher node in a display screen having a selected size, and showing a child or grandchild node thereof and interconnected by channels thereto in a second display screen wherein the first and second display screens are arranged to show a portion of the tree graph, and where N is a whole number of at least two and wherein visual icons indicate that said higher node has a child node which cannot be displayed.

19. A method for displaying a $N_H$ by $N_V$ tree graph having vertically and horizontally related nodes defined vertically and horizontally by N levels where N is a whole number of 3 or greater on a display screen comprising the steps of:

dividing the display screen into multiple equally sized portions;

displaying in said display screen portions at most one node of said $N_H$ by $N_V$ tree graph; and displaying in the same display screen portion as the node, all of the child nodes of said node of said $N_H$ by $N_V$ tree graph, wherein symbols corresponding to said node or said child nodes thereof are displayed in said display screen portions, and wherein said symbols incorporate visual icons to indicate that said child nodes have sibling nodes which cannot be displayed.

20. The method of claim 19, wherein the step of displaying all of the child nodes comprises:

dividing said same display screen portion into k further equally sized display screen portions, where k is the number of child nodes of said node, and displaying in said divided display screen portions at most one child node of said node.

21. The method according to claim 19 wherein said symbols corresponding to said node or said child nodes thereof are displayed in the top left hand corners of said display screen portions.

22. A method according to claim 19 wherein an observer may use a pointing device to select one of said child nodes to display on said display screen the child nodes of said child nodes causing said tree graph to be reordered for said display screen.

* * * * *